(12) United States Patent
Newman et al.

(10) Patent No.: US 7,066,511 B2
(45) Date of Patent: Jun. 27, 2006

(54) NON-CONDUCTIVE EXTENSION POLE

(75) Inventors: Robert D. Newman, Greenwood, MO (US); Buford J. Guittar, Greenwood, MO (US)

(73) Assignee: Specialty Products of Greenwood, Missouri, Inc., MO (US)

( * ) Notice: Subject to any disclaimer, the term of this patent is extended or adjusted under 35 U.S.C. 154(b) by 218 days.

(21) Appl. No.: 10/249,272

(22) Filed: Mar. 27, 2003

(65) Prior Publication Data
US 2004/0189028 A1 Sep. 30, 2004

(51) Int. Cl.
F16B 7/10 (2006.01)

(52) U.S. Cl. .................... 294/19.1; 81/53.11; 403/377; 403/379.2

(58) Field of Classification Search ............. 403/109.3, 403/109.5, 112, 117, 377, 379.3, 379.2, 379.1, 403/109.2; 81/53.1; 294/19.1; 16/113.1, 16/429
See application file for complete search history.

(56) References Cited

U.S. PATENT DOCUMENTS

| 1,541,839 A | | 6/1925 | Metzler et al. |
| 3,101,212 A | | 8/1963 | Cater |
| 3,101,966 A | | 8/1963 | Thomas et al. |
| 4,385,849 A | | 5/1983 | Crain |
| 4,582,352 A | | 4/1986 | Filter et al. |
| 4,948,149 A | * | 8/1990 | Lin et al. ..................... 473/492 |
| 5,011,104 A | * | 4/1991 | Fang ....................... 248/125.8 |
| 5,148,723 A | | 9/1992 | Newman, Sr. et al. |
| 5,220,707 A | * | 6/1993 | Newman et al. .............. 16/429 |
| 5,580,064 A | * | 12/1996 | Childers, Jr. ................ 273/400 |
| 5,593,196 A | | 1/1997 | Baum et al. |
| 5,649,780 A | * | 7/1997 | Schall ..................... 403/109.4 |
| 5,692,856 A | * | 12/1997 | Newman et al. ............ 403/352 |
| 5,765,453 A | | 6/1998 | Mims |
| 5,983,455 A | * | 11/1999 | Polzin et al. .................. 16/429 |
| 6,045,288 A | * | 4/2000 | Pasternak et al. ........ 403/109.3 |
| 6,223,628 B1 | | 5/2001 | Barron |
| 6,453,777 B1 | * | 9/2002 | Newman et al. ........... 81/53.11 |
| 6,546,596 B1 | * | 4/2003 | Grote et al. .................. 16/429 |

* cited by examiner

Primary Examiner—Eileen D. Lillis
Assistant Examiner—Esther Onyinyechi Okezie
(74) Attorney, Agent, or Firm—Hovey Williams LLP

(57) ABSTRACT

An extension pole suitable for use in light bulb changing operations. The extension pole comprises first, second, and third telescopically intercoupled sections. A first locking assembly selectively locks the first and second sections to one another, and a second locking assembly selectively locks the second and third section to one another. The extension pole is made entirely of non-conductive materials to thereby reduce the risk of electrical shock to the operator.

15 Claims, 2 Drawing Sheets

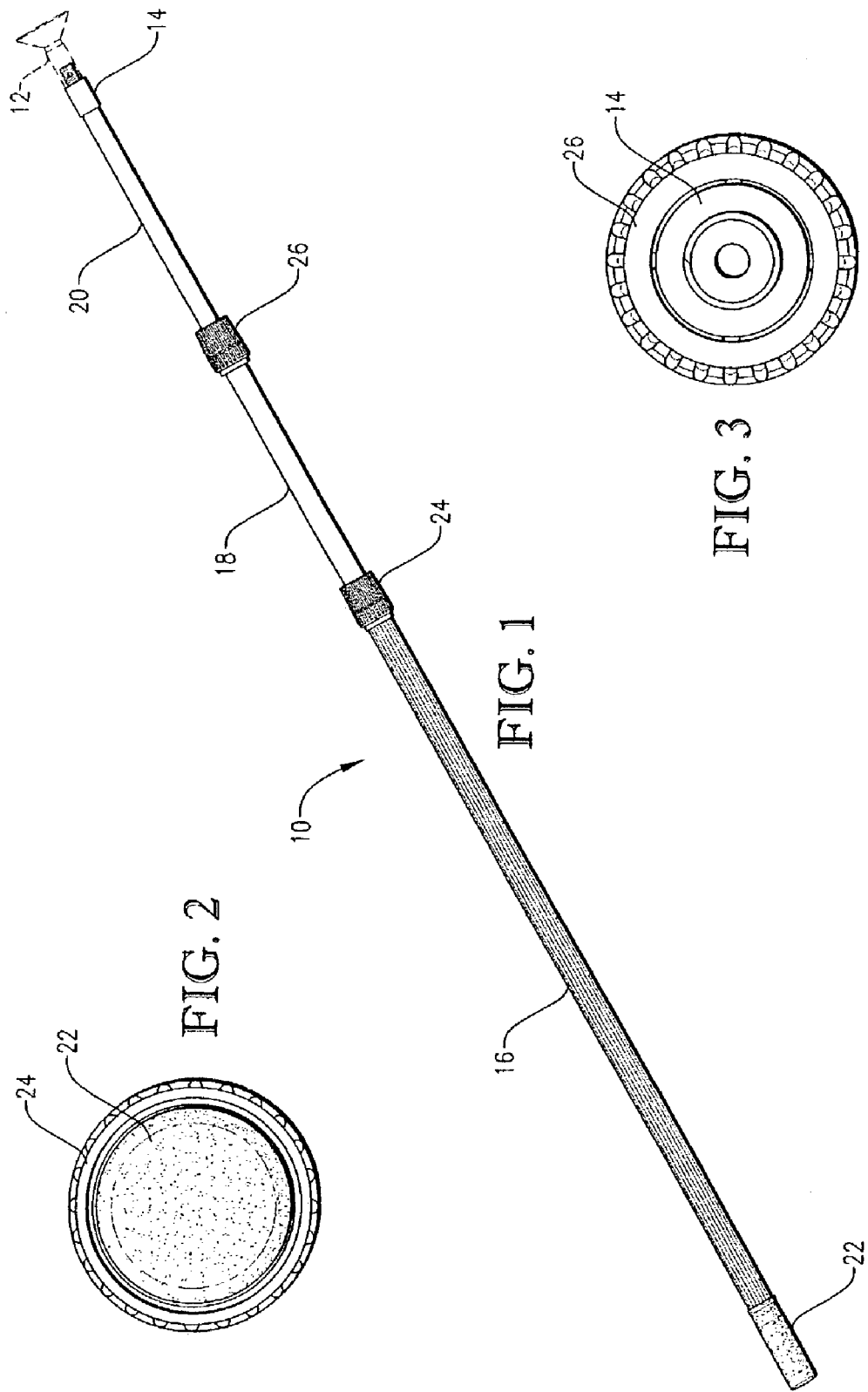

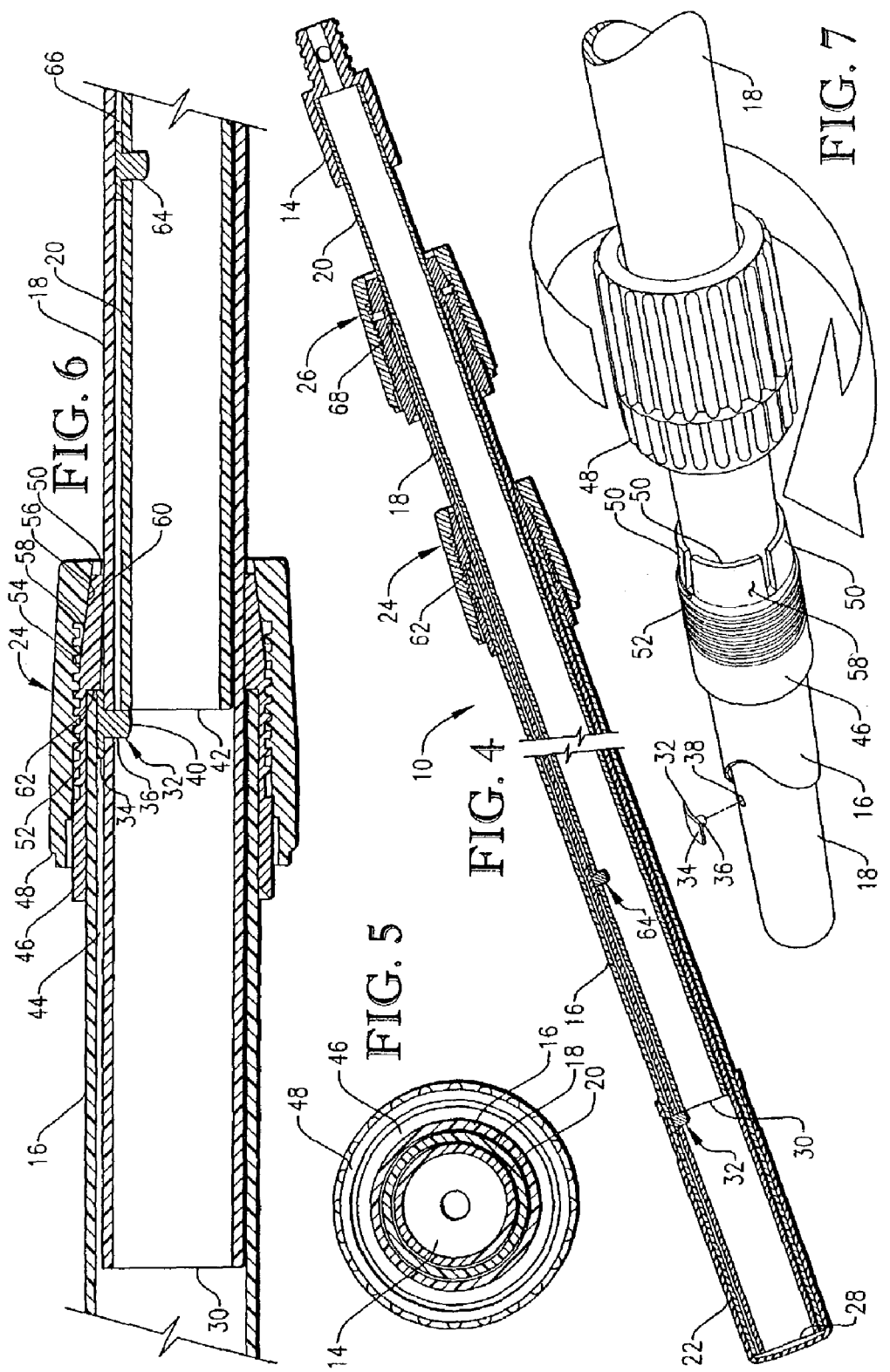

NON-CONDUCTIVE EXTENSION POLE

BACKGROUND OF INVENTION

1. Field of the Invention

The present invention relates generally to extendable poles that can be used to change light bulbs. In another aspect, the invention concerns a three-section, non-conductive, extension pole with a bulb-gripping device coupled to an end of the pole.

2. Discussion of Prior Art

Extension poles with bulb-gripping devices have been used for years to change light bulbs in hard-to-reach locations such as, for example, recessed light fixtures in vaulted ceilings. Most conventional extendable bulb-changing devices include two elongated, telescoping sections with a bulb-gripping device attached to the end of one section. Conventional extension poles used for changing light bulbs typically employ a pin-type locking mechanism for selectively inhibiting relative telescopic sliding of the two sections. Further, the telescoping sections of many conventional extendable bulb-changing devices are composed of an electrically conductive material (e.g., aluminum).

Conventional extendable bulb-changing devices employing only two telescoping sections have the limitation of providing a maximum extended reach of only twice the retracted length of the pole. Thus, conventional two-section extension poles having a long reach may be inconvenient to handle and/or store in the retracted position because of their excessive retracted length. Further, conventional pin-type locking devices used to selectively inhibit telescopic sliding of extension pole sections require alignment of the shiftable locking pin coupled to one section with apertures in another section. If the section with the locking pin and the section with the pin-receiving openings are twisted relative to one another, the operator of the pole must take the time to manipulate the poles back and forth until the locking pin and the aperture are properly aligned. Finally, constructing an extendable light bulb changing apparatus out of an electrically conductive material increases the risk of operator injury due to electrical shock.

SUMMARY OF INVENTION

Responsive to these and other problems, it is an object of the present invention to provide an extendable bulb-changing apparatus having an extended length which is more than twice its retracted length.

A further object of the present invention is to provide an extendable bulb-changing device employing locking devices which do not require alignment of a locking pin with an opening in the pole section.

A still further object of the present invention is to provide an extendable bulb-changing device that is made entirely of non-conductive materials to thereby minimize the risk of electrical injury to the operator.

It should be noted that the above-listed objects need not all be accomplished by the invention claimed herein and other objects and advantages of this invention will be apparent from the following description of the invention and appended claims.

Accordingly, in one embodiment of the present invention, there is provided an extension pole comprising first, second, and third telescopically intercoupled sections; a first locking assembly for selectively locking the first and second sections; and a second locking assembly for selectively locking the second and third sections. The extension pole comprises no components having a relative conductivity greater than about 10.

In another embodiment of the present invention, there is provided an extension pole comprising first, second, and third telescopically intercoupled pole sections; a first locking assembly; and a second locking assembly. The first locking assembly comprises a first fixed member and a first collect disposed around and threadably coupled to the first fixed member. The first locking assembly is operable to selectively lock the first and second pole sections to one another via rotation of the first collect relative to the first fixed member. The second locking assembly comprises a second fixed member and a second collect disposed around and threadably coupled to the second fixed member. The second locking assembly is operable to selectively lock the second and third pole sections to one another via rotation of the second collect relative to the second fixed member. The first, second, and third pole sections are formed of a material having a relative conductivity less than about 10.

In still another embodiment of the present invention, there is provided an extension pole comprising first, second, and third telescopically intercoupled sections; a first locking assembly for selectively locking the first and second sections; a second locking assembly for selectively locking the second and third sections; and a first stop. The first stop includes a first head and a first projection extending from the first head. The second section includes a first side wall defining a first opening. The first projection extends through the first opening. The first projection has a first distal portion extending past the first side wall. The first head and the first distal portion are disposed on generally opposite sides of the first side wall.

BRIEF DESCRIPTION OF DRAWINGS

A preferred embodiment of the present invention is described in detail below with reference to the attached drawing figures, wherein:

FIG. 1 is a side view of a non-conductive three-section extension pole constructed in accordance with one embodiment of the present invention, showing the extension pole in a partially extended position;

FIG. 2 is an end view of the normally-lower end of the extension pole;

FIG. 3 is an end view of the normally-upper end of the extension pole;

FIG. 4 is a sectional view of the extension pole cut along a plane extending through the central axis of elongation of the pole, particularly illustrating the manner in which the three sections of the extension pole are telescopically intercoupled when the extension pole is in a fully retracted position;

FIG. 5 is a sectional view of the extension pole cut along a plane perpendicular to the axis of elongation of the extension pole, particularly illustrating the circular shape of the three extension pole sections;

FIG. 6 is an enlarged sectional view of the lower locking assembly of the extension pole, particularly illustrating the working components of the locking assembly and the manner in which the locking assembly cooperates with a stop member to prevent axial separation of the lower and middle pole sections; and FIG. 7 is a partial perspective view of the lower locking assembly with the collect of the locking assembly being removed from the threaded fixed member attached to the distal end of the lower pole section, particularly illustrating the external threads of the fixed member and the manner in which the collect can be threaded onto the fixed member.

DETAILED DESCRIPTION

Referring initially to FIGS. 1–3, extension pole 10 is illustrated in a partially extended position with a bulb-gripping device 12 (shown in phantom lines) coupled to a normally-upper end of pole 10 via a connector 14. It is preferred for bulb-gripping device 12 to be constructed in accordance with the description provided in U.S. Pat. No. 5,148,723, issued Sep. 22, 1992, the entire disclosure of which is incorporated herein by reference. Extension pole 10 generally comprises a first section 16, a second section 18, and a third section 20. First, second, and third sections 16,18,20 are telescopically intercoupled with second section 18 being at least partly received in first section 16 and third section 20 being at least partly received in second section 18. Extension pole 10 can be retracted and extended by sliding second section 18 into and out of first section 16 and third section 20 into and out of second section 18. Extension pole 10 further includes a hand grip 22 coupled to a normally-lower end of pole 10. Hand grip 22 provides a gripping surface to aid in rotation of extension pole 10 and bulb-changer 12 during bulb changing operations. Hand grip 22 also covers the normally-lower end of extension pole 10 to thereby prevent debris from entering the inside of extension pole 10. Extension pole 10 also includes a first locking assembly 24 and a second locking assembly 26. First locking assembly 24 is operable to selectively permit and inhibit relative axial shifting of first section 16 and second section 18. Second locking assembly 26 is operable to selectively permit and inhibit relative axial shifting of second section 18 and third section 20. The specific manner in which first and second locking assemblies 24,26 operate will be discussed in detail below.

Referring now to FIG. 4, extension pole 10 is illustrated in a fully retracted position. When extension pole 10 is in the fully retracted position, a proximal end 28 of second section 18 contacts the inside of hand grip 22 to prevent further retraction of second section 18 into first section 16. By preventing further retraction of second section 18 into first section 16, a space is maintained between first locking assembly 24 and second locking assembly 26. This space maintained between first locking assembly 24 and second locking assembly 26 ensures that the hands or fingers of the extension pole operator will not be pinched between first locking assembly 24 and second locking assembly 26 when second section 18 is retracted into first section 16. When extension pole 10 is in the fully retracted position, a proximal end 30 of third section 20 engages a first stop 32 which is fixed to second section 18 to thereby prevent further retraction of third section 20 into second section 18. By preventing further retraction of third section 20 into second section 18, a space is maintained between connector 14 and second locking assembly 26. This space maintained between connector 14 and second locking assembly 26 ensures that the hands or fingers of the extension pole operator will not be pinched between connector 14 and second locking assembly 26 when third section 20 is fully retracted into second section 18. Referring to FIG. 5, it can be seen that each of the first, second, and third sections 16,18,20 have a generally circular and tubular configuration.

Referring now to FIG. 6, an enlarged sectional view of first locking assembly 24 is illustrated with second section 18 being fully extended out of first section 16. When second section 18 is fully extended relative to first section 16, first stop 32 prevents second section 18 from pulling out of first section 16. As shown in FIGS. 6 and 7, first stop 32 generally includes an arcuate shaped head 34 and a projection 36 extending from the center of the concave side of head 34. First stop 32 is coupled to second section 18 by extending projection 36 through an opening 38 in second section 18. As shown in FIG. 6, a distal portion 40 of projection 36 extends past the side wall of second section 18 and projects into the internal channel defined by second section 18. As shown in FIG. 6, when third section 20 is fully retracted relative to second section 18, a proximal end 42 of third section 20 contacts distal portion 40 of first stop 32 to thereby prevent further retraction of third section 20 into second section 18. As shown in FIG. 6, head 34 of first stop 32 and distal portion 40 of first stop 32 are disposed on generally opposite sides of the side wall of second section 18. Further, head 34 is disposed between and engages both the side wall of first section 16 and the side wall of second section 18 to thereby form a gap 44 therebetween.

Referring now to FIGS. 6 and 7, locking assembly 24 generally includes a fixed member 46 and a collect 48. Fixed member 46 is rigidly coupled to a distal end of first section 16. Fixed member 46 includes a plurality of resilient fingers 50 which extend past the distal end of first section 16. Fixed member 46 includes an externally threaded portion 52 which allows collect 48 to be threadably coupled to fixed member 46 via internal threads 54 of collect 48. When collect 48 is disposed around and threadably coupled to fixed member 46, a tapered inner surface 56 of collect 48 engages a tapered outer surface 58 of resilient fingers 50 thereby deflecting fingers 50 and causing a locking surface 60 of fingers 50 to frictionally engage the outer surface of second section 18. When collect 48 is rotated relative to fixed member 46 in a tightening direction, locking surface 60 of flexible fingers 50 is forced radially inward against the outside surface of second section 18, thereby inhibiting relative shifting of first and second sections 16,18. When collect 48 is rotated relative to fixed member 46 in a loosening direction opposite the tightening direction, the radial force exerted by locking surface 60 of fingers 50 is reduced, thereby permitting axial shifting of second section 18 relative first section 16.

As shown in FIG. 6, fixed member 46 of locking assembly 24 presents a radially extending shoulder 62. When second section 18 is fully extended relative to first section 16 (as shown in FIG. 6), head 34 of first stop 32 engages radial shoulder 62 of first locking assembly 24 to thereby prevent further extension of second section 18 out of first section 16. Thus, first stop 32 performs the dual function of preventing further retraction of third section 20 into second section 18 and preventing further extension of second section 18 out of first section 16 when second section 18 is fully extended relative to first section 16 (as shown in FIG. 6).

Referring to FIGS. 4 and 6, a second stop 64 is coupled to third section 20 via extension of a projection of second stop 64 through an opening in third section 20. Second stop 64 has a configuration similar to that of first stop 32. As shown in FIG. 6, the head of second stop 64 is disposed generally between the side walls of third section 20 and second section 18 to form a gap 66 therebetween. As shown in FIG. 4, second locking assembly 26, which has a similar configuration to first locking assembly 24, includes a radially extending shoulder 68 which engages the head of second stop 64 when third section 20 is fully extended relative to second section 18. Thus, second stop 64 is operable to prevent third section 20 from pulling out of second section 18 when third section 20 is fully extended relative to second section 18.

In order to reduce the risk of electrical shock during use of extension pole 10 in bulb changing operations, it is preferred for extension pole 10 to be formed entirely of substantially non-conductive materials. Preferably all the materials of construction for all the components of extension pole 10 have a relative electrical conductivity of less than about 10, more preferably less than about 5, and most preferably less than 2. As used herein, the term "relative conductivity" or "relative electrical conductivity" shall denote the electrical conductivity of a material relative to copper, with the relative conductivity of copper being 100. For example, since copper has an actual electrical conductivity of about 60,000,000 siemens (1/ohm-m), a material having a relative conductivity of 10 would have an actual electrical conductivity of about 6,000,000 siemens.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. An extension pole comprising:
   first, second, and third telescopically intercoupled sections;
   a first locking assembly for selectively locking the first and second sections;
   a second locking assembly for selectively locking the second and third sections; and
   a first stop including a first head and a first projection extending from the first head,
   said second section including a first side wall defining a first opening,
   said first projection extending through the first opening,
   said first projection having a first distal portion extending past the first side wall,
   said first head and said first distal portion being disposed on generally opposite sides of the first side wall,
   said extension pole being shiftable between a fully retracted position where the extension pole has a minimum length and a fully extended position where the extension pole has a maximum length,
   said first head engaging the first locking assembly when the extension pole is in the fully extended position to thereby prevent further extension of the second section relative to the first section,
   said first distal portion engaging the third section when the extension pole is in the fully retracted position to thereby prevent further retraction of the third section relative to the second section,
   said first locking assembly including a first fixed member rigidly coupled to the first section and a first collet disposed around and threadably coupled to the first fixed member,
   said first fixed member presenting a radial shoulder that engages the first head when the extension pole is in the fully extended position.

2. The extension pole of claim 1,
   said first head being disposed generally between the first and second sections.

3. The extension pole of claim 2,
   said first head contacting both the first and second sections.

4. The extension pole of claim 3,
   said first head having a generally actuate shape.

5. The extension pole of claim 1,
   said first fixed member including a plurality of resilient first fingers for frictionally engaging the second section,
   said first collect being operable to vary the amount of friction between the first fingers and the second section via rotation of the first collect relative to the first fixed member.

6. The extension pole of claim 1; and
   a second stop including a second head and a second projection extending from the second head,
   said third section including a second side wall defining a second opening,
   said second projection extending through the second opening,
   said second projection having a second distal portion extending past the second side wall,
   said second head and said second distal portion being disposed on generally opposite sides of the second side wall.

7. The extension pole of claim 6,
   said second head being disposed between the first and second side walls.

8. The extension pole of claim 7,
   said second head contacting both the first and second side walls.

9. The extension pole of claim 6,
   said second head engaging the second locking assembly when the extension pole is in the fully extended position to thereby prevent further extension of the third section relative to the second section.

10. An extension pole comprising:
    first, second, and third telescopically intercoupled sections;
    a first locking assembly for selectively locking the first and second sections;
    a second locking assembly for selectively locking the second and third sections;
    a first stop including a first head and a first projection extending from the first head,
    said second section including a first side wall defining a first opening,
    said first projection extending through the first opening,
    said first projection having a first distal portion extending past the first side wall,
    said first head and said first distal portion being disposed on generally opposite sides of the first side wall,
    said extension pole being shiftable between a fully retracted position where the extension pole has a minimum length and a fully extended position where the extension pole has a maximum length,
    said first head engaging the first locking assembly when the extension pole is in the fully extended position to thereby prevent further extension of the second section relative to the first section,
    said first distal portion engaging the third section when the extension pole is in the fully retracted position to thereby prevent further retraction of the third section relative to the second section; and
    a second stop including a second head and a second projection extending from the second head, said third section including a second side wall defining a second opening, said second projection extending through the second opening, said second projection having a second distal portion extending past the second side wall, said second head and said second distal portion being disposed on generally opposite sides of the second side wall, said second head engaging the second locking assembly when the extension pole is in the fully extended position to thereby prevent further extension of the third section relative to the second section, said second locking assembly including a second fixed member rigidly coupled to the second section and a second collect disposed around and threadably coupled to the second fixed member, said second fixed member presenting a radial shoulder that engages the second head when the extension pole is in the fully extended position.

11. An extension pole comprising:

first and second telescopically intercoupled sections;

a locking assembly for selectively locking the first and second sections; and a stop including a head and a projection extending from the head, said second section including a side wall defining an opening, said projection extending through the opening, said projection having a distal portion extending past the side wall, said head and said distal portion being disposed on generally opposite sides of the side wall, said extension pole being shiftable between a fully retracted position where the extension pole has a minimum length and a fully extended position where the extension pole has a maximum length, said head engaging the locking assembly when the extension pole is in the fully extended position to thereby prevent further extension of the second section relative to the first section, said locking assembly including a fixed member rigidly coupled to the first section and a collect disposed around and threadably coupled to the fixed member, said fixed member presenting a radial shoulder that engages the head when the extension pole is in the fully extended position.

12. The extension pole of claim 11, said head being disposed generally between the first and second sections.

13. The extension pole of claim 12, said head contacting both the first and second sections.

14. The extension pole of claim 13, said head having a generally actuate shape.

15. The extension pole of claim 11, said fixed member including a plurality of resilient fingers for frictionally engaging the second section, said collect being operable to vary the amount of friction between the fingers and the second section via rotation of the collect relative to the fixed member.

* * * * *